UNITED STATES PATENT OFFICE.

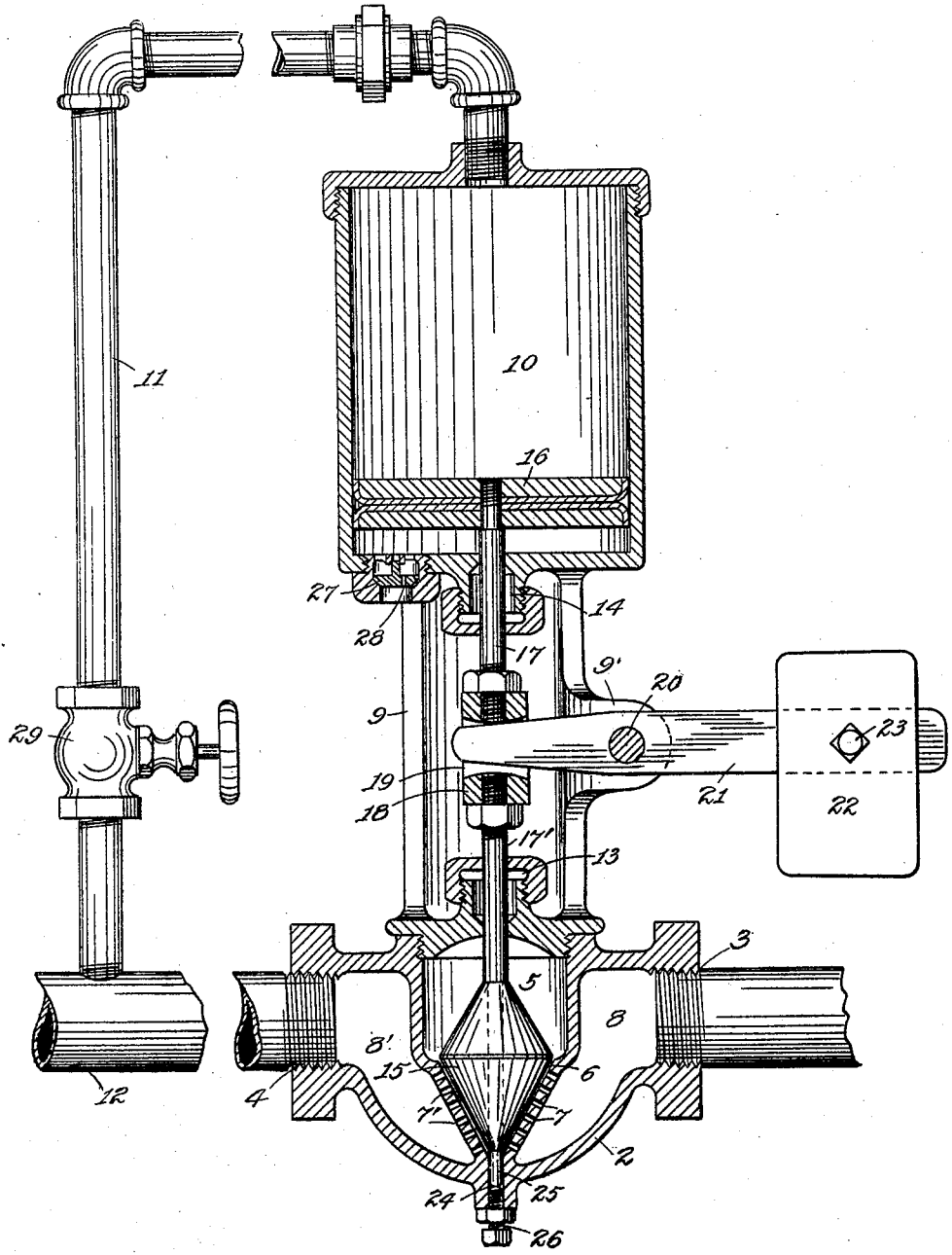

HARVEY L. HARBAUGH, OF SEATTLE, WASHINGTON.

REDUCING-VALVE.

No. 807,074.  Specification of Letters Patent.  Patented Dec. 12, 1905.

Application filed April 13, 1905. Serial No. 255,293.

*To all whom it may concern:*

Be it known that I, HARVEY L. HARBAUGH, a citizen of the United States, residing at Seattle, in the county of King and State of Washington, have invented certain new and useful Improvements in Reducing-Valves, of which the following is a specification, reference being had therein to the accompanying drawing.

The object of this invention is the provision of improved and reliable means for maintaining the pressure of a fluid within a service or discharge pipe at an approximately constant amount and irrespective of the pressures prevailing within the supply-pipe. I attain this end by the novel construction, adaptation, and combination of devices, as will be described hereinafter, with reference to the said drawing, which shows in longitudinal vertical section apparatus embodying my invention.

The numeral 2 denotes a valve-casing having an inlet-opening 3 and an outlet-opening 4, with a partition between in which is formed a chamber 5, having a conical-shaped valve-seat 6 therebelow provided with a plurality of perforations 7 and 7', making communication between said chamber and the spaces 8 and 8'. Rigidly connected to the casing by frame 9 is a superposed cylinder 10, which is communicatively connected at its upper end by a pipe 11 with the discharge-pipe 12, leading from said outlet-opening of the casing and whereat the pressure of the fluid is to be maintained at a uniform amount. The adjacent ends of said casing and the cylinder are respectively provided with stuffing-boxes 13 and 14 and through which projects a stem connected at its lower end with a valve 15, having a conical-shaped seating-face, and at its upper end with a piston 16. The said stem is preferably made in two parts 17 17', which are connected together by a coupling-sleeve 18, which is apertured, as at 19. Fulcrumed by a pin 20 to lug or lugs 9' of the frame is a lever 21, having its shorter arm project into or through said sleeve-aperture and carrying on its outer arm a weight 22, capable of being adjustably secured lengthwise thereof, as by a binding-screw 23. Extending in an axial direction below the valve and slidably fitted in a guide-socket 24 is a tail-rod 25. This socket is screw-threaded at its lower end for the reception of a registering screw-bolt 26, whereby the downward travel of the valve or the tailpiece, which is integrally connected thereto, may be limited for the purpose of preventing the complete closure of the valve, as is desirable under certain conditions. Provided in the bottom of said cylinder is a check-valve 27, openable inwardly for the unobstructed admission of the external air into the cylinder and preventing the outflow of the same, except what can escape through a leakage-hole 28, provided in this valve. The pipe 11 is desirably provided with a shut-off valve (indicated by 29) in order to intercept the communication between the said discharge-pipe and the cylinder when it is desired to make the device ineffective.

In operation the gas, steam, or other fluid is admitted from the supply-pipe through the valve-openings to the discharge-pipe 12 until the pressure within the latter which acts upon the upper surface of the piston 16 is able to overcome the counteracting effect of the weight 22 when the valve is forcibly pressed down to shut the valve-opening or as nearly so as is permitted by the positioning of the bolt 26. When the pressure within the pipe 12 is less than the desired amount and for which the counterweight 22 is adjusted, then it is evident that the valve will be raised from its seat to permit a greater quantity of the fluid to pass into the discharge-pipe until the pressure therein has been augmented and is sufficiently powerful to balance or overcome the opposing force of the counterweight, and thus accommodate itself to variations of initial pressure and delivering the same at a practically constant amount. This result is due in a considerable degree to the action of the check-valve, which allows of the rapid raising of the valve to admit a larger volume of the fluid to build up the pressure to normal, yet at the same time when the pressure through any cause should greatly exceed the amount for which the valve is set the restricted outflow of the air from the under side of the piston prevents the rapid closing of the valve and the resultant spasmodic variations of pressures common to other types of reducing-valves.

Among the points of special merit in the present invention are, first, its simplicity, while meeting every demand in the service for which intended; second, the absence of springs, which are less reliable and positive than the force of gravity; third, the rapidity at which the valve is capable of being opened to maintain the pressure at the desired amount; fourth, the retardation of the closing movement of the valve and the absence of all danger of a quick and entire stoppage of fluid-supply; fifth, the accessibility of the operative parts for adjustment or other purposes, and, sixth, the durability of the few and efficient parts, requiring comparatively little attention.

Having described my invention, what I claim as new, and desire to secure by Letters Patent, is—

1. A reducing-valve, comprising a valve-casing provided with a perforated conical-shaped valve-seat, a valve of corresponding shape, a cylinder rigidly connected with said casing, a piston within the cylinder, a stem operatively connecting said valve with the piston, a lever having one of its arms engaging with the stem and carrying a weight upon its other arm, said weight, and a communicative connection between the discharge end of the valve-casing and the cylinder in proximity of its upper end.

2. A reducing-valve, comprising a valve-casing provided with inlet and outlet openings and a valve-seat therebetween, a valve for said seat, a stem for the valve and extending through a stuffing-box of said casing and into a superposed cylinder and connected therein to a piston, said piston, said cylinder which is provided at its lower end with a check-valve having a leakage-port extending therethrough, said check-valve, communicative connection between the upper end of the cylinder and the casing through said outlet-opening thereof, and means engaging with said stem tending to open the valve.

In testimony whereof I affix my signature in presence of two witnesses.

HARVEY L. HARBAUGH.

Witnesses:
PIERRE BARNES,
W. L. FROSS.